US012644275B2

(12) United States Patent
Downs et al.

(10) Patent No.: US 12,644,275 B2
(45) **Date of Patent: *Jun. 2, 2026**

(54) FASTENING AND ALIGNMENT MEMBER

(71) Applicant: Simpson Strong-Tie Company Inc., Pleasanton, CA (US)

(72) Inventors: Michael S. Downs, Coeur d'Alene, ID (US); Jin-Jie Lin, Livermore, CA (US); Timothy M. Stauffer, Pleasant Hill, CA (US); Emmet J Mielbrecht, Danville, CA (US); Dustin P. Muhn, San Francisco, CA (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,675

(22) Filed: Apr. 22, 2024

(65) Prior Publication Data

US 2024/0271412 A1 Aug. 15, 2024

Related U.S. Application Data

(60) Continuation of application No. 17/409,721, filed on Aug. 23, 2021, now Pat. No. 11,965,329, which is a (Continued)

(51) Int. Cl.

| | |
|---|---|
| ***E04B 1/38*** | (2006.01) |
| ***B25C 7/00*** | (2006.01) |
| ***E04B 1/26*** | (2006.01) |

(52) U.S. Cl.

CPC ................ *E04B 1/388* (2023.08); *B25C 7/00* (2013.01); *E04B 1/2608* (2013.01); (Continued)

(58) Field of Classification Search

CPC ........ E04B 1/2612; E04B 1/2608; E04B 1/40; E04B 7/06; E04B 7/063; F16B 9/052; F16B 15/0023

See application file for complete search history.

(56) References Cited

U.S. PATENT DOCUMENTS 1,406,723 A * 2/1922 Caldwell ................ F16B 9/058 403/232.1

1,491,015 A 4/1924 McFarland (Continued)

FOREIGN PATENT DOCUMENTS

DE 1 692 842 2/1955

DE 1 919 902 7/1965

(Continued)

OTHER PUBLICATIONS

"Connectors for Wood Construction", 1997, cover page and pp. 2, 7 and 8, Advanced Connector Systems, Tempe, AZ.

(Continued)

*Primary Examiner* — Daniel J Wiley

(57) ABSTRACT

A connection between a connector, a fastener and one or more structural members is disclosed. The connector can be formed with a fastening and alignment member. The fastening and alignment member includes a projecting member and a protruding member in close proximity to a predetermined location for the fastener.

22 Claims, 21 Drawing Sheets

Related U.S. Application Data division of application No. 15/207,202, filed on Jul. 11, 2016, now Pat. No. 11,098,478.

(60) Provisional application No. 62/190,407, filed on Jul. 9, 2015.

(52) U.S. Cl.
CPC .... *E04B 1/2612* (2013.01); *E04B 2001/2644* (2013.01); *E04B 2001/2652* (2013.01); *E04B 2001/2672* (2013.01); *E04B 2001/2684* (2013.01); *E04B 2001/2692* (2013.01); *E04B 2001/389* (2023.08)

(56) References Cited

U.S. PATENT DOCUMENTS

| | | | | |
|---|---|---|---|---|
| 1,986,981 | A | 1/1935 | Ross | |
| 2,340,924 | A | 2/1944 | Boye | |
| 2,746,780 | A | 5/1956 | Demetrius | |
| 3,031,727 | A | 5/1962 | Nesbitt | |
| 3,141,532 | A | 7/1964 | Runyan | |
| 3,312,485 | A | 4/1967 | Koenigshof | |
| 3,387,481 | A | 6/1968 | Harvey et al. | |
| 3,596,941 | A | 8/1971 | Tracy | |
| 3,601,428 | A | 8/1971 | Gilb | |
| 3,752,512 | A * | 8/1973 | Gilb | E04B 1/2608 403/232.1 |
| 3,972,169 | A * | 8/1976 | Sheppard, Jr. | E04B 1/2612 52/715 |
| 4,089,141 | A | 5/1978 | Herowx | |
| 4,230,416 | A | 10/1980 | Giln | |
| 4,261,155 | A | 4/1981 | Gilb | |
| 4,291,996 | A | 9/1981 | Gilb | |
| 4,305,677 | A | 12/1981 | Kowalski | |
| 4,410,294 | A | 10/1983 | Gilb et al. | |
| 4,413,456 | A | 11/1983 | Gilb | |
| 4,480,941 | A | 11/1984 | Gilb et al. | |
| 4,630,766 | A | 12/1986 | Steeves et al. | |
| 4,738,071 | A | 4/1988 | Ezard | |
| 4,841,690 | A | 6/1989 | Commins | |
| 4,856,696 | A | 8/1989 | Seld | |
| 4,928,867 | A | 5/1990 | Jensen | |
| 5,004,369 | A | 4/1991 | Young | |
| 5,016,873 | A * | 5/1991 | Bossa | A63G 9/12 403/403 |
| 5,052,607 | A | 10/1991 | Dutton | |
| 5,150,982 | A | 9/1992 | Gilb | |
| 5,193,730 | A | 3/1993 | Tanaka et al. | |
| 5,217,317 | A | 6/1993 | Young | |
| 5,238,167 | A | 8/1993 | Howard et al. | |
| 5,284,311 | A | 2/1994 | Baer | |
| 5,452,835 | A | 9/1995 | Shkolnikov | |
| 5,457,928 | A | 10/1995 | Sahnazarian | |
| 5,560,156 | A * | 10/1996 | McDonald | E04B 1/2608 52/715 |
| 5,579,975 | A | 12/1996 | Moorman | |
| 5,598,680 | A | 2/1997 | Wilhemi | |
| 5,603,580 | A | 2/1997 | Leek et al. | |
| 5,664,922 | A | 9/1997 | Janssen et al. | |
| 5,797,232 | A | 8/1998 | Larson | |
| 5,803,338 | A | 9/1998 | Singer et al. | |
| 6,022,165 | A * | 2/2000 | Lin | E04B 1/2608 403/231 |
| 6,082,439 | A | 7/2000 | Kato et al. | |
| 6,186,391 | B1 | 2/2001 | Barandun | |
| 6,213,679 | B1 | 4/2001 | Frosbosilo | |
| 6,474,037 | B2 | 11/2002 | Thompson | |
| 6,490,840 | B1 | 12/2002 | Thompson | |
| 6,523,309 | B1 | 2/2003 | Finlay et al. | |
| 6,523,321 | B1 | 2/2003 | Leek et al. | |
| 6,665,991 | B2 | 12/2003 | Hasan | |
| 6,739,490 | B1 | 5/2004 | Shkolnikov et al. | |
| 6,789,718 | B2 | 9/2004 | Canlas et al. | |
| 7,516,876 | B2 | 4/2009 | Ohmori | |
| D610,717 | S | 2/2010 | Lin | |
| 7,730,675 | B2 | 6/2010 | Hill | |
| 8,082,702 | B2 | 12/2011 | Hill | |
| 8,176,689 | B1 * | 5/2012 | Thompson | E04G 23/0218 52/92.1 |
| 8,347,582 | B1 * | 1/2013 | Thompson | E04B 1/2608 52/712 |
| 8,356,449 | B2 | 1/2013 | Lin | |
| 8,627,991 | B2 | 1/2014 | Francis et al. | |
| 8,656,650 | B2 | 2/2014 | Gray et al. | |
| 9,027,897 | B2 | 5/2015 | Hill | |
| 9,228,338 | B2 * | 1/2016 | Lin | E04B 1/2612 |
| 9,650,780 | B2 | 5/2017 | Tan | |
| 9,874,008 | B2 * | 1/2018 | Doupe | E04B 1/2612 |
| 11,098,478 | B2 | 8/2021 | Downs et al. | |
| 2004/0079044 | A1 * | 4/2004 | Troth | E04B 7/063 52/696 |
| 2004/0096269 | A1 | 5/2004 | Shahnazarian | |
| 2006/0191233 | A1 * | 8/2006 | Tamlyn | F16B 15/0023 52/702 |
| 2008/0101855 | A1 * | 5/2008 | Lin | F16B 9/058 403/232.1 |
| 2010/0031601 | A1 * | 2/2010 | Lin | E04B 1/2612 52/696 |
| 2012/0222382 | A1 * | 9/2012 | Brekke | E04B 1/2612 52/702 |
| 2012/0298716 | A1 | 11/2012 | Segura | |
| 2013/0067850 | A1 * | 3/2013 | Sasanecki | E04B 1/2612 52/702 |
| 2017/0138039 | A1 * | 5/2017 | Doupe | E04B 1/2612 |
| 2018/0135296 | A1 * | 5/2018 | Brekke | B21D 47/00 |
| 2018/0142463 | A1 * | 5/2018 | Siddhartha | E04B 1/2608 |
| 2018/0171620 | A1 * | 6/2018 | Allen | E04B 1/215 |
| 2018/0363289 | A1 * | 12/2018 | Jensen | E04B 1/388 |
| 2019/0186121 | A1 | 6/2019 | Innsbruck | |

FOREIGN PATENT DOCUMENTS

| | | | |
|---|---|---|---|
| DE | 1 452 669 | | 3/1969 |
| DE | 26 17 231 | | 11/1976 |
| DE | 28 13 952 | | 10/1979 |
| DE | 2806094 | C2 | 10/1986 |
| DE | 200 22 892 | U1 | 7/2002 |
| EP | 2 186 580 | A2 | 5/2010 |
| EP | 2 886 731 | A1 | 6/2015 |
| FR | 1469500 | | 2/1967 |
| GB | 428473 | | 5/1935 |
| GB | 2515754 | A | 1/2015 |
| JP | S 58-119087 | U | 8/1983 |
| JP | H 11-222929 | A | 8/1999 |
| JP | 3328182 | B2 | 9/2002 |
| JP | 2004-36376 | A | 2/2004 |
| JP | 2000-104350 | A | 7/2009 |
| JP | 4289703 | B2 | 7/2009 |
| NL | 7314848 | | 5/1975 |
| WO | WO 2011/123520 | A1 | 10/2011 |
| WO | WO 2013/057464 | A9 | 4/2013 |

OTHER PUBLICATIONS

"Connectors for Wood Construction", 1987, cover page and pp. 4,7,10, 16-18, 20, 34, 44, Catalog C87H-1, Simpson Strong-Tie Company, Inc., Pleasanton, CA.

"Wood Construction Connectors: 2013-2014", Dec. 2012, cover page and back cover and pp. 51, 69, 70, 175, 182, C-2013, Simpson Strong-Tie Company, Inc., Pleasanton, CA.

"Notification of Transmittal of the International Search Report and the Written Opinion of the International Searching Authority, or the Declaration", PCT mailing for International Application No. PCT/US2016/041807, Oct. 24, 2016, 16 pages, International Searching Authority.

Japanese Patent Office, Office Action in Application No. 2018-521199, Sep. 8, 2020, 4 pages, Japanese Patent Office, Japan.

Tanaka House Materials, Catalog, Aug. 29, 2001, front and back cover and pp. 24-28, 42 and 49, 2003, 2. 50,000 (AS), Tanaka, Japan.

(56) References Cited

OTHER PUBLICATIONS

International Preliminary Report on Patentability and Written Opinion of the International Searching Authority, Application No. PCT/US2016/041807, Jan. 18, 2018, 12 pages, European Patent Office, Rijswijk, NL.
Advanced Connector Systems Catalog, at least as early as Dec. 22, 1997, front cover and pp. 2, 7-12, 14, 16, 26, 28-31, Advanced Connector Systems, Tempe, Arizona.
"Communication pursuant to Article 94(3) EPC", European Patent Application 16 744 991.7, Nov. 6, 2019, 8 pages, European Patent Office.
Japanese Patent Office, Office Action in Application No. 2018-521199, Mar. 11, 2021, 2 pages, Japanese Patent Office, Japan.

* cited by examiner

FASTENING AND ALIGNMENT MEMBER

BACKGROUND OF THE INVENTION

This invention provides a connection between a fastener, a connector and a structural member. The present invention has particular utility in positioning a power fastener driving tool for driving the fastener through the connector and into the structural member. The connector is generally used for joining two or more structural members together, such as a hanger for attaching a joist to a header.

The present invention provides that the material adjacent a fastener opening or point of fastener entry in a connector have a unique shape that improves the driving of the fastener, as well as the ability of the fastener to resist loads on the connection. The material of the connector adjacent the opening can be formed with a conical, downwardly projecting protrusion that guides the fastener towards the opening and can, in certain embodiments, itself form a connection with the structural member.

Using power fastener driving tools to join connectors to structural members can be very cost effective, as driving fasteners with a power tool is generally faster than driving fasteners by hand. Typical power fastener driving tools can be electrically or pneumatically powered. They can also be gas powered or use exploding charges. When properly used, power driving tools also have good consistency in driving the fastener with sufficient force such that the nail will be driven to the correct depth with its head contacting the surface of the wood or the face of the connector. This is helpful as the fastening strength of a nail is improved when the head of the nail is in contact with the surface of the connector or member into which it is driven. When the head of the nail is in contact with the connector or member, the nail connection is said to have end fixity. A fastener with end fixity resists rotation under shear loading. The state when a nail is not in contact is called an under-driven nail. The present invention is designed to assist with the use of power fastening guns and to improve the strength of the connection made with the fastener.

It is also important when installing connectors to use the prescribed number of fasteners in the proper locations to achieve design load values. As such most connector manufactures will pre-punch holes in the connectors where the fasteners are supposed to be driven. Sometimes the openings will be of different shapes to differentiate between required fasteners and additional fasteners that may be used. As powered, fastener driving tools can be rather bulky and block the user's ability to see exactly where the fastener is being driven, a number of inventions have been developed to help the operator locate the opening in the connector.

A number of prior inventions addressed the issue of helping the operator locate the opening when using a power fastener driving tool by modifying the tool.

U.S. Pat. No. 5,579,975, granted to Charles J. Moorman, teaches power fastener driving tool where the nail to be driven projects forwardly of the tool such that the user can actually see the fastener being received in the opening before they actuate the tool. This powered fastener driving tool is specifically designed for driving a nail through an opening in a metal connector. Such driving tools are typically called metal connector nail guns.

U.S. Pat. No. 5,238,167, granted to Frank C. Howard et al, and U.S. Pat. No. 5,452,835, granted to Yury Shkolnikov, teach power fastener driving tools that use a protruding finger that is disposed adjacent the fastener to be driven.

When this finger is received by the opening in the connector the user will know the fastener will be properly located.

U.S. Pat. No. 3,312,485, granted to G. A. Koenighshof, and U.S. Pat. No. 4,928,867, granted to Mark B. Jensen et al, addressed the issue of helping the operator locate the opening or point of fastener entry when using a power fastener driving tool by shaping the material of the connector around the opening in a unique way.

U.S. Pat. No. 4,928,867, in one approach, taught forming the nail gun with a special alignment foot that cooperated with an especially shaped alignment tab on the connector to align the fastener to be driven with the opening in the connector. In most of the embodiments shown in the patent, when the alignment foot captures the alignment member, the fastener should be in the proper position. In another approach, the patent teaches an alignment member on the connector that will receive the nose of a typical power fastener gun. In this embodiment, one or more upper rings or arcs are formed concentrically about the opening or predetermined position for the fastener, or, conversely, it can be a groove partially or fully circumscribing the predetermined position, or a combination of one or more upper rings and grooves. In most embodiments shown in the patent, the alignment foot of the tool and the alignment member of the connector are designed to fit together.

Similarly, U.S. Pat. No. 3,031,727, granted G. G. Nesbitt, teaches nail openings in a connector plate where the nail openings are surrounded by an embossed ring that may be used to center a nail gun on the nail opening. This patent also teaches forming the nail opening with jagged, pointed projections. These projections are formed from the metal being pushed and ruptured during the formation of the nail hole. According to the inventor, the projections bite into the wood when a nail is driven through the plate, increasing the area of contact and thereby increasing the holding power of the nail. Published US Application 2004/0096269, filed by George Shahnazarian and published on May 20, 2004, also teaches forming fastener openings with rearwardly extending metal projections that will be embedded in the wood of the beam when a fastener is driven through the opening.

The present invention provides an improved fastening and alignment member on the connector that can both aid in the driving of the fastener by a power fastener gun and improve the connection between the connector and the structural member.

SUMMARY OF THE INVENTION

The present invention provides a unique connection between a fastener, a connector and a structural member.

The present invention provides a fastening and alignment member on a connector.

The fastening and alignment member can be formed as one or more sloping surfaces that descend toward the opening or predetermined location for a fastener to be driven through the connector. The sloping surfaces are located on the periphery of the opening or predetermined fastener location. The sloping surfaces can be a plurality of grooves or valleys converging or traveling towards the opening.

The one or more sloping surfaces are formed adjacent to the opening or predetermined location for the fastener at the periphery of the opening or predetermined location. The sloping surfaces can be part of a projecting member that protrudes below the back face of the connector, such that the projecting member can be embedded in the material of the structural or support member. The projecting member is adjacent to the opening and preferably surrounds the entire periphery of the opening. Preferably, the projecting member is concentric with the opening. Preferably, the rim of the opening is depressed with respect to the outlying portions of the front face of the connector around the opening or predetermined location for the fastener. In certain embodiments, the projecting member protrudes towards the attachment face of the structural member. In preferred embodiments, the projecting member protrudes into the structural member.

The sloping surfaces can descend from one or more upper portions adjacent to the sloping surfaces. The upper portions are located radially farther away from the opening or predetermined location for the fastener than the opening. The upper portions can be arranged in concentric manner around the fastener opening or predetermined location for the fastener. The sloping surface can be a single annular surface making a conical frustum.

The one or more upper portions can be surrounded by a groove or a series of depressions in the top surface of the connector. The one or more upper portions can partially or fully circumscribe the predetermined position for the fastener. The one or more depressions can partially or fully circumscribe the innermost upper portion or portions. The groove or series of depressions are preferably formed as protruding members that protrude from the back face of the connector.

The body portions that make up the connector can be formed as a planar members with planar front and back surfaces and the fastening and alignment member is a deformation in the body of the connector that creates depressions in the planar front surface and protrusions or projections extending out of the planar back surface of the connector. The fastening an alignment member lifts the body portion of the connector off of the attachment face of the structural member.

The fastening and alignment member can be formed as a upper ring or arc, or a plurality of upper rings or arcs surrounding or partially surrounding an opening or a predetermined location or position for driving a fastener through the connector.

The fastening and alignment member can be formed as a plurality of concentrically disposed upper rings or arcs or upper portions separated by a trough or groove or other recess, surrounding or partially surrounding an opening or a predetermined location for driving a fastener through the connector. The groove or recess between the upper portions can have a back surface that projects farther away from the front surface of the connector than the back surfaces of the connector that are disposed radially outward and farther away from the opening than the trough. The back surface of the recess can extend as far toward the attachment face of the structural member as the projecting member. Preferably, the projecting member extends farthest away from the front surface of the connector than the back surface of the recess and the back surface of the portions of the connector disposed radially outward from the recess or trough surrounding the opening.

The opening can adopt any shape. Typical fastener openings in connectors are round or triangular with rounded vertices.

In the preferred embodiment, the present invention provides a conical, downwardly projecting protrusion that guides the fastener towards the opening and itself forms a connection with the structural member.

It is another benefit of the present invention that the use of the fastening and alignment member on a connector increases the end fixity of the nail or other fastener with a head that is received in the opening in the fastening and alignment member. If the head is not driven all the way, the funnel shape of the feature means less deformation needs to occur before fixity is developed. The sloping shape of the fastening and alignment feature or member means more of the nail head will be engaged by the feature and sooner under deforming loads.

It is another benefit of the present invention that the embossed protrusions help locate the nose-piece of certain guns.

Another benefit of the present invention is that the funnel-shaped sides of the guide help direct the nail into the opening.

The washer like recess or groove between the upper portions in closer proximity to the nail opening and the outer upper portion farther away from the nail opening of the preferred embodiment also results in less deformation of the wood member by having the pressure of the nail head distributed across a wider surface area.

The present invention is also designed be used with pneumatic tools used in general framing, commonly called framing nailers. The noses of framing nailers are typically formed with teeth that grip the wood, and the nose is designed so that the nail does not protrude from the tool. Being able to work such nailers is a benefit to workers who prefer to use a framing nailer as they do not have to change tools to install a hanger or connector.

The present invention also provides a hanger connector having the alignment and fastening member of the present invention.

DETAILED DESCRIPTION OF THE DRAWINGS

FIG. 1 is a perspective view of a connection made according to the present invention. The connector is formed with fastening and alignment members of the present invention. The connector is a hanger shown joining a joist to a header.

Figure 6:
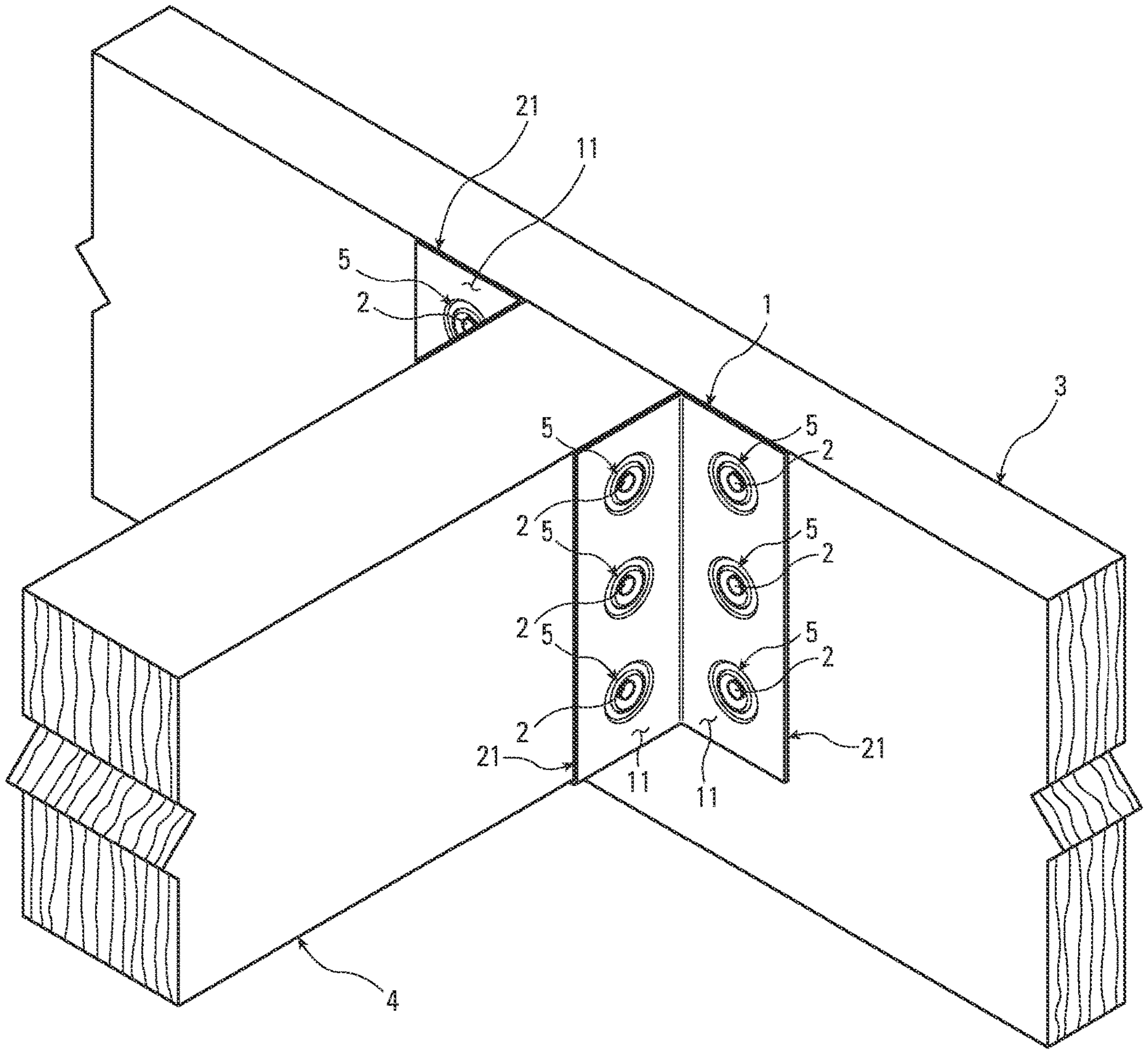

FIG. 6 is a perspective view of a connection made according to the present invention. The connector is formed with fastening and alignment members of the present invention. The connector is shown joining a joist to a header.

Figure 7:
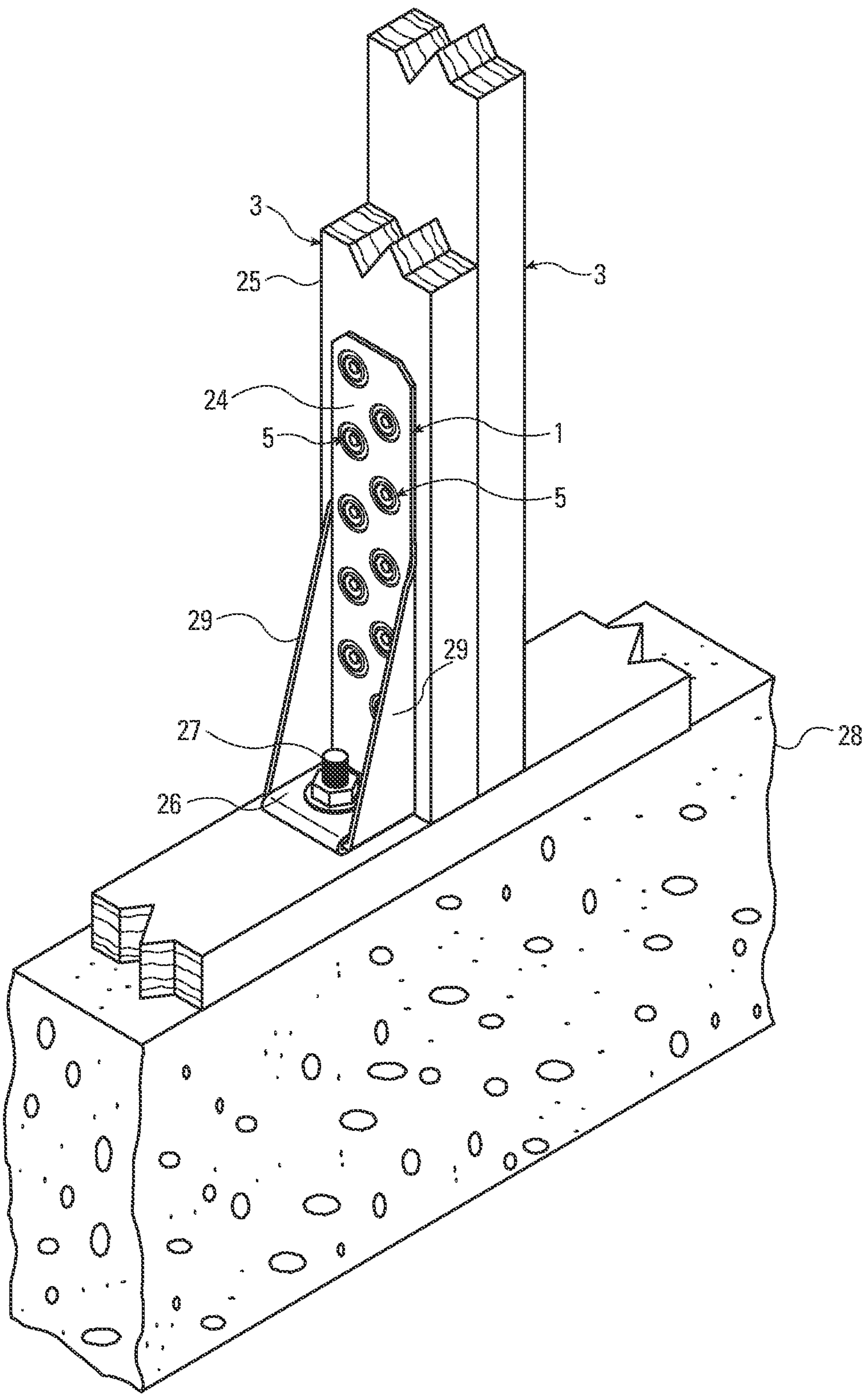

FIG. 7 is a perspective view of a connection made according to the present invention. The connector is formed with fastening and alignment members of the present invention. The connector is a holdown shown joining a stud to a sill plate and a foundation.

Figure 8:
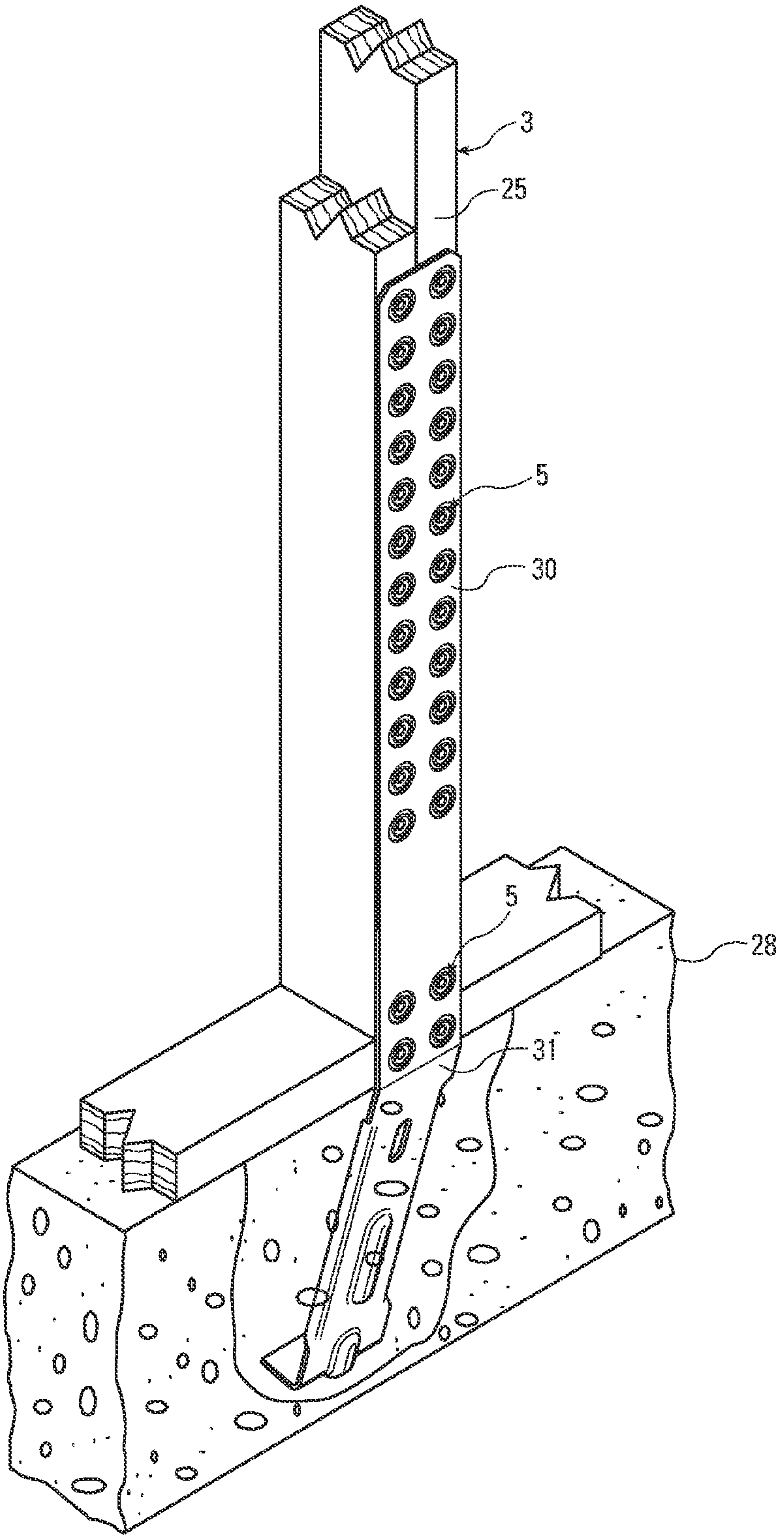

FIG. 8 is a perspective view of a connection made according to the present invention. The connector is formed with fastening and alignment members of the present invention. The connector is a holdown shown joining a stud to a sill plate and a foundation.

Figure 9:
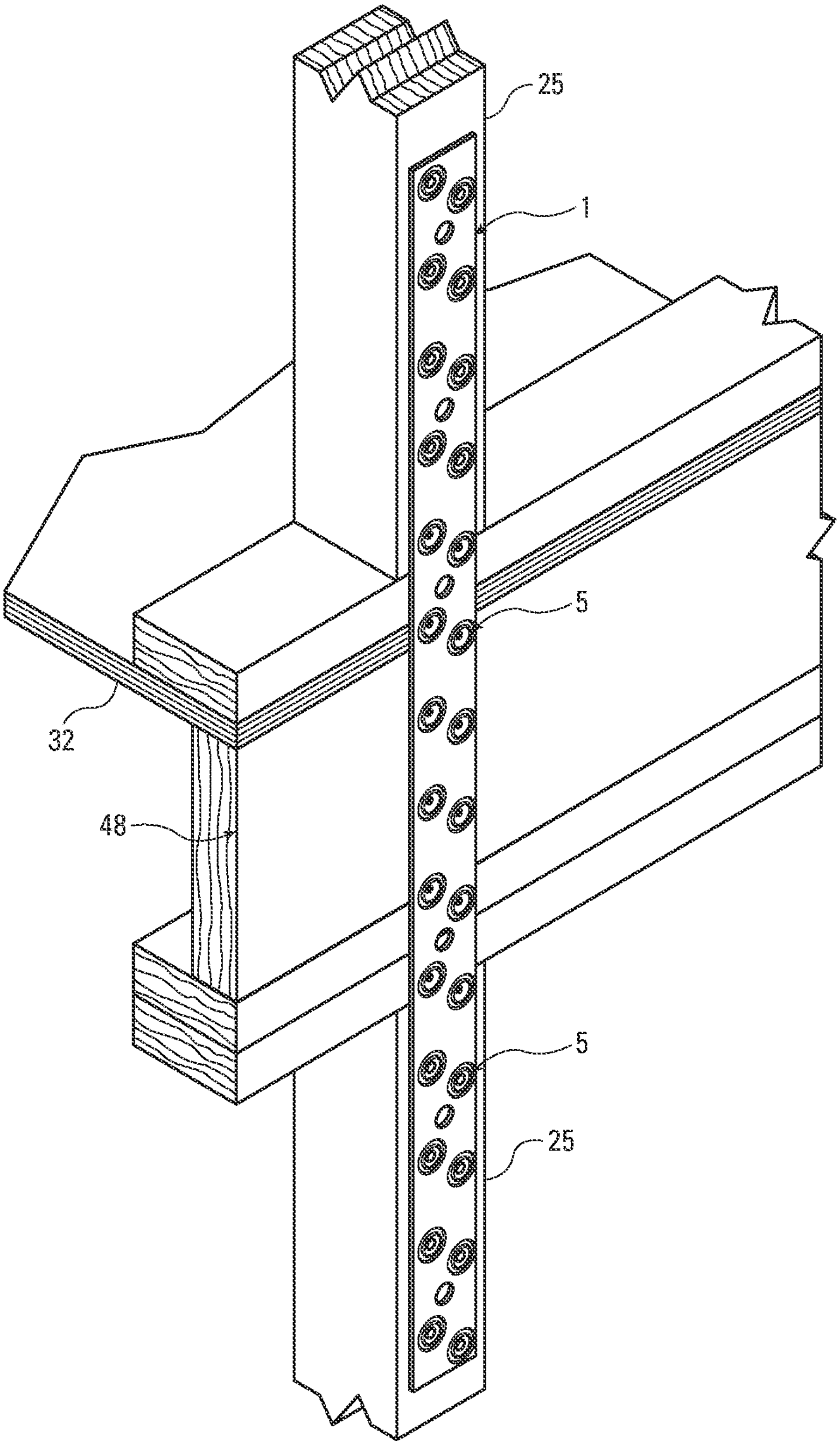

FIG. 9 is a perspective view of a connection made according to the present invention. The connector is formed with fastening and alignment members of the present invention. The connector is a strap shown joining a pair of studs across a rim joist between two levels of a building.

Figure 10:
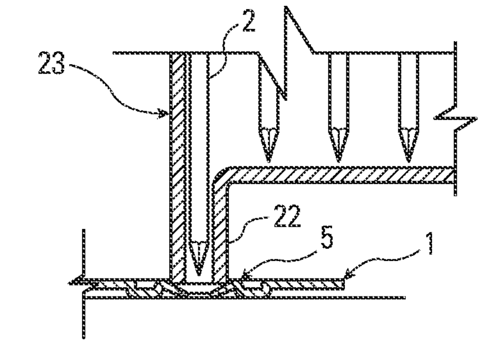

FIG. 10 is a cross-sectional view of a connector formed with a fastening and alignment member of the present invention, and of a nail gun in contact with the fastening and alignment member and ready to drive a nail through an opening in the connector for the fastener.

Figure 11:
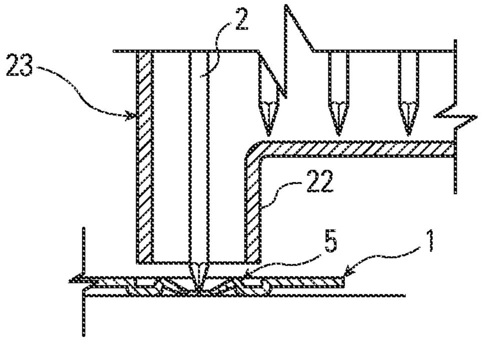

FIG. 11 is a cross-sectional view of a connector formed with a fastening and alignment member of the present invention, and of a nail gun aligned with the fastening and alignment member and ready to drive a nail through an opening in the connector for the fastener.

Figure 12:
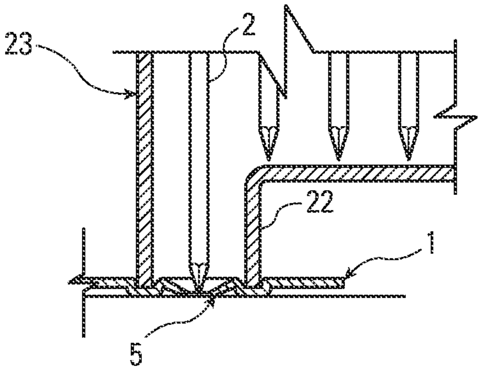

FIG. 12 is a cross-sectional view of a connector formed with a fastening and alignment member of the present invention, and of a nail gun received by the fastening and alignment member and ready to drive a nail through an opening in the connector for the fastener. FIG. 12 is similar to FIG. 3, except the tip of the nail is shown already received by the opening in the fastener.

Figure 13:
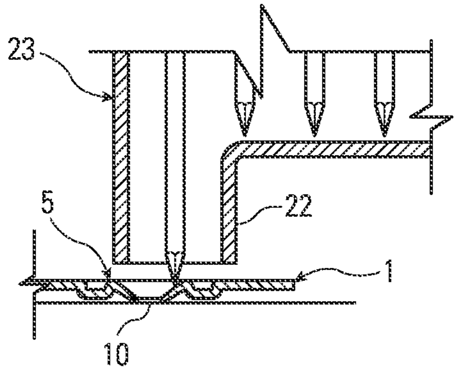

FIG. 13 is a cross-sectional view of a connector formed with a fastening and alignment member of the present invention, and of a nail gun that is aligned with the fastening and alignment member and ready to drive a nail through an opening in the connector for the fastener. The sloping surface of the fastening and alignment member will help guide the nail to the opening.

Figure 14:
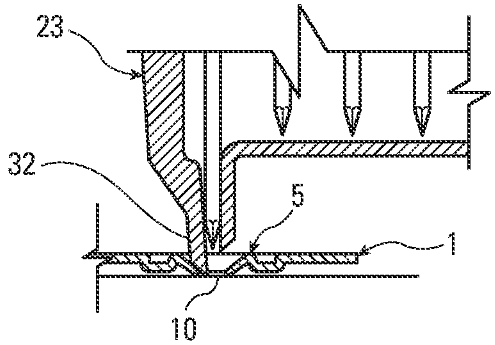

FIG. 14 is a cross-sectional view of a connector formed with a fastening and alignment member of the present invention, and of a nail gun received by the fastening and alignment member and ready to drive a nail through an opening in the connector for the fastener.

Figure 15:
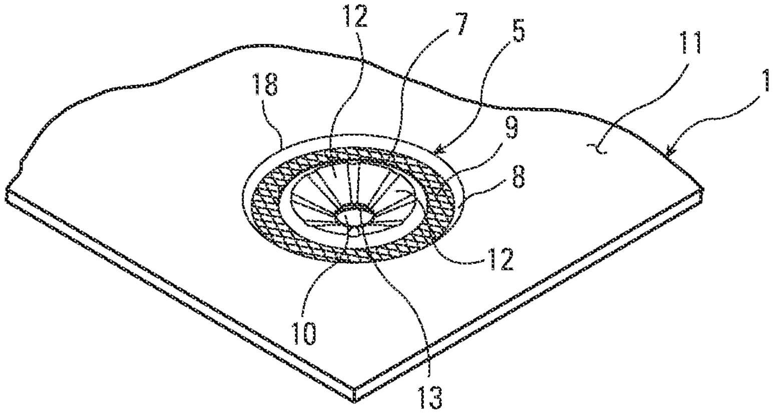

FIG. 15 is a perspective view of a portion of a connector formed with a fastening and alignment member of the present invention.

Figure 16:
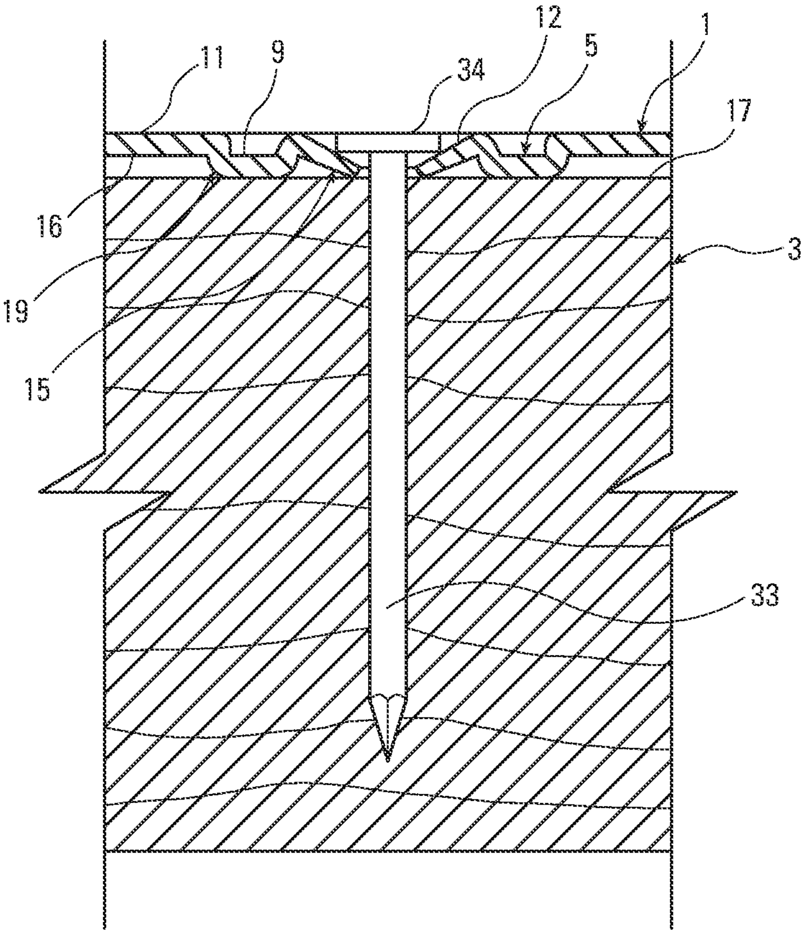

FIG. 16 is a cross-sectional view of a connector formed with a fastening and alignment member of the present invention. The structural member is also shown in cross-section and a nail is received by the connector and the structural member.

Figure 17:
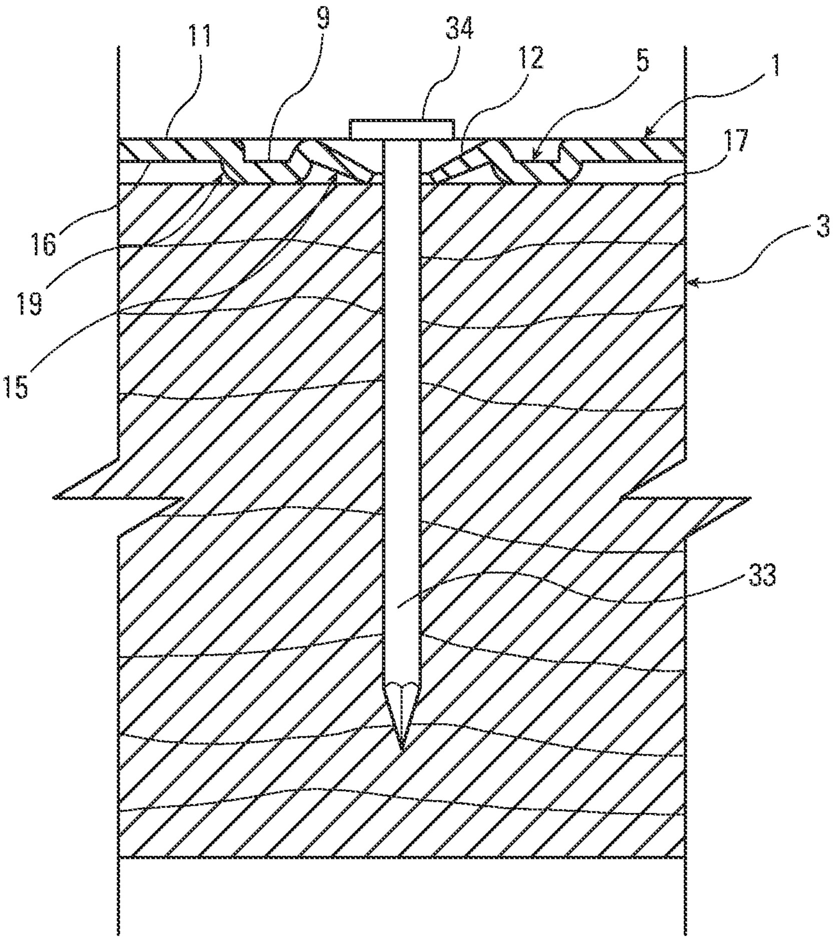

FIG. 17 is a cross-sectional view of a connector formed with a fastening and alignment member of the present invention. The structural member is also shown in cross-section and a nail is received by the connector and the structural member. The nail shown in FIG. 17 has been under-driven.

Figure 18:
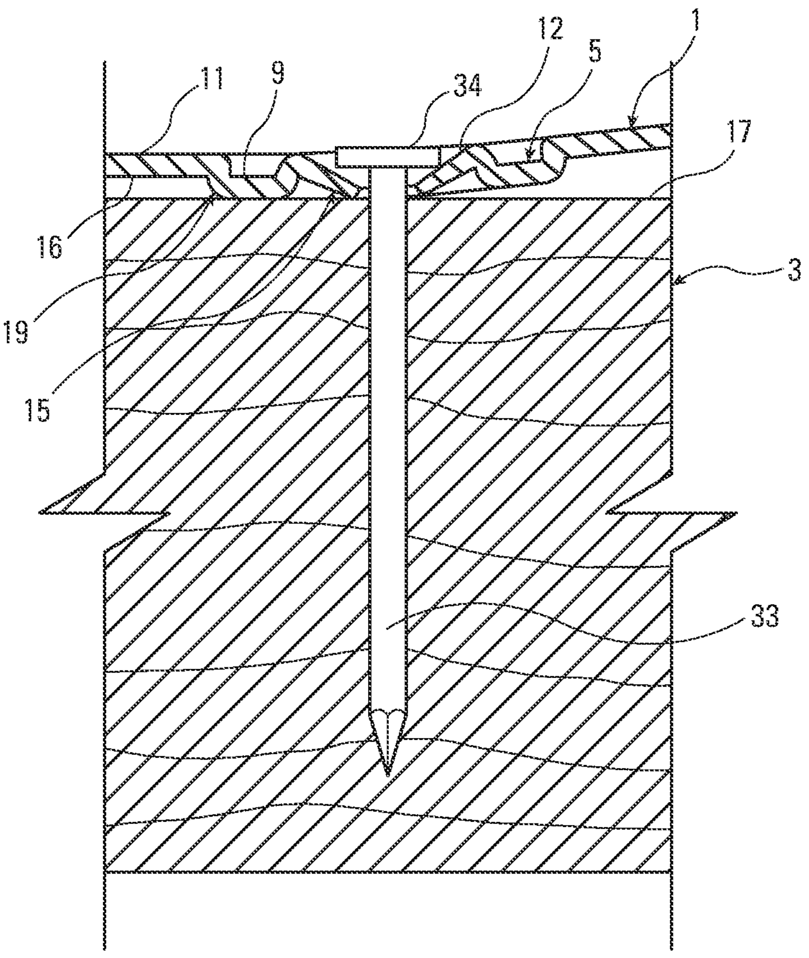

FIG. 18 is a cross-sectional view of a connector formed with a fastening and alignment member of the present invention. The structural member is also shown in cross-section and a nail is received by the connector and the structural member. The nail shown in FIG. 18 has been under-driven, and the connector is shown flexing under load and making contact with the head of the fastener.

Figure 19:
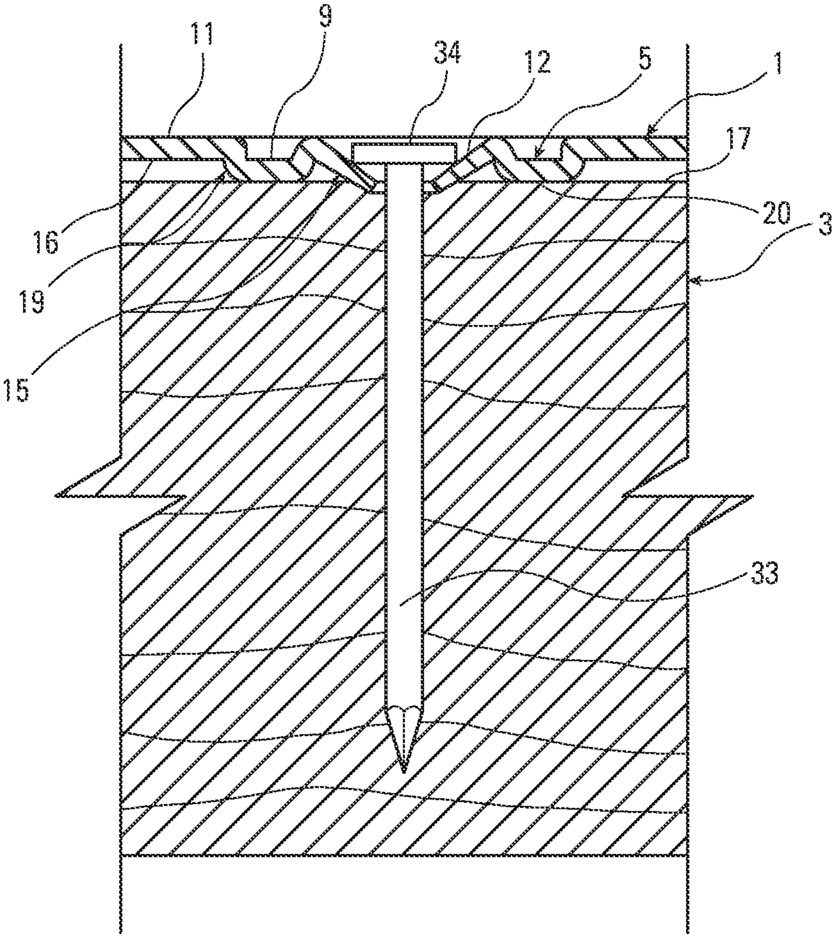

FIG. 19 is a cross-sectional view of a connector formed with a fastening and alignment member of the present invention. The structural member is also shown in cross-section and a nail is received by the connector and the structural member. A portion of the projecting member is shown embedded in the structural member.

Figure 20:
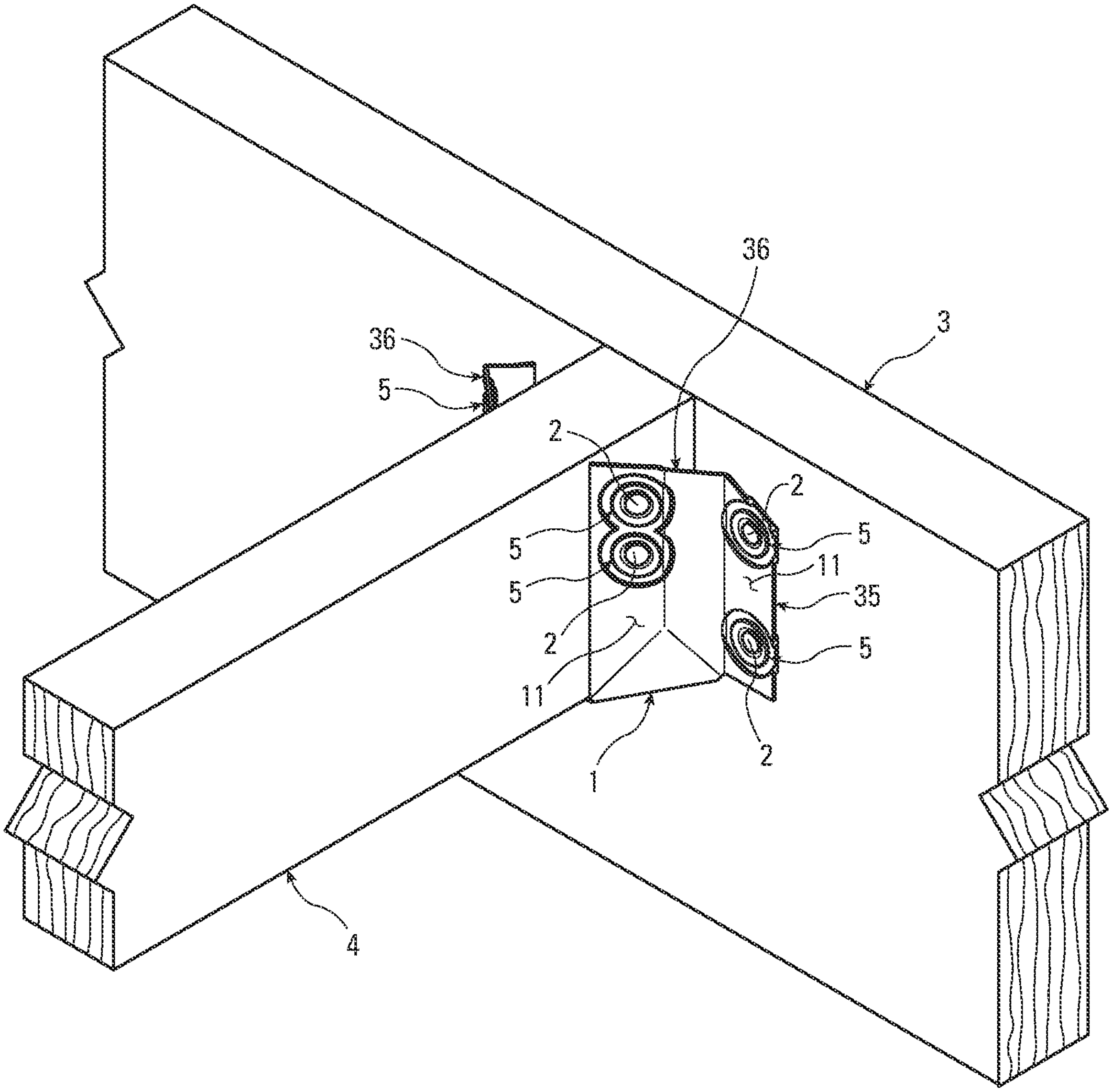

FIG. 20 is a connection made according to the present invention, wherein a connector is shown joining a joist to a header. The connector is formed with fastening and alignment members of the present invention.

Figure 21:
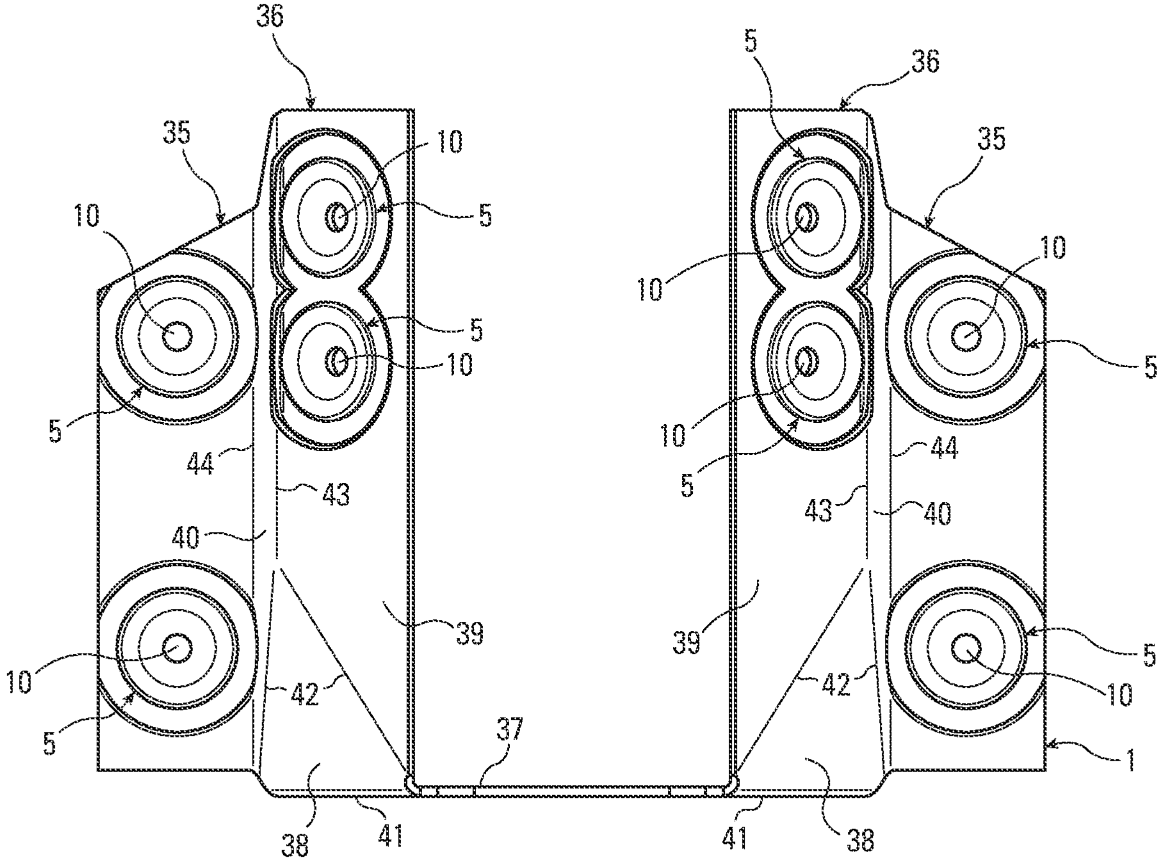

FIG. 21 is front view of the connector of FIG. 20.

Figure 22:
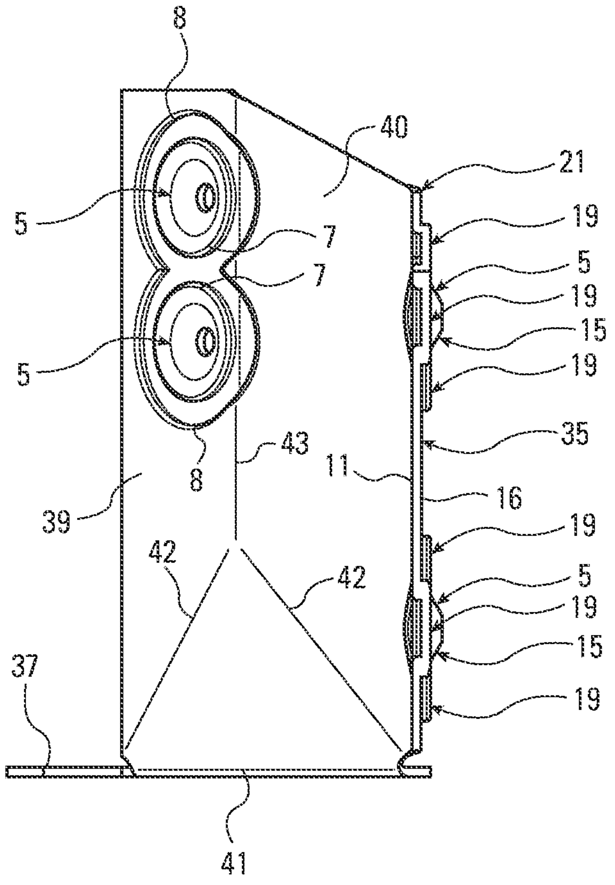

FIG. 22 is a right side view of the connector of FIG. 20. The left side view is identical.

Figure 23:
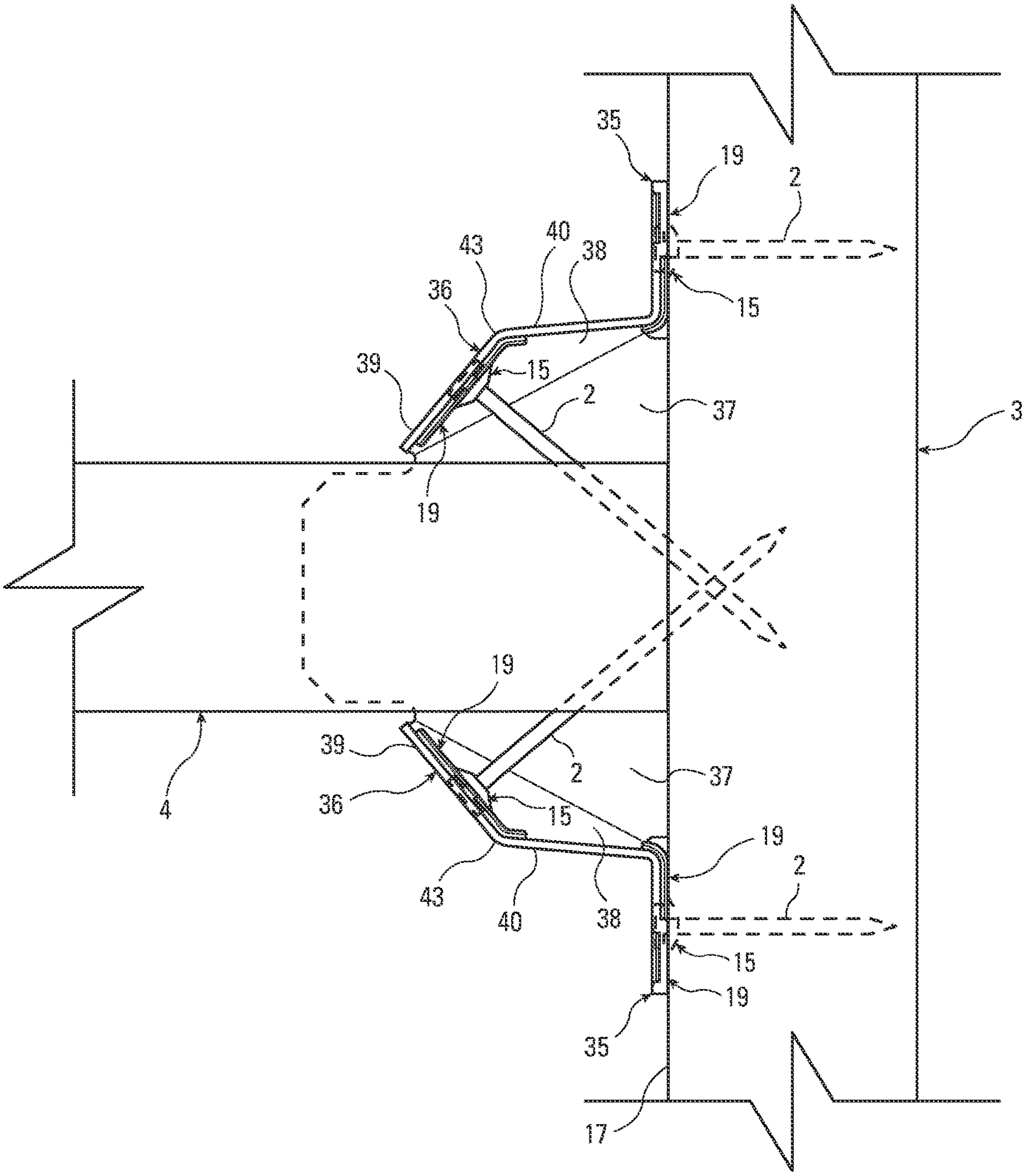

FIG. 23 is a top view of the connection of FIG. 20. The embedded portions of the fasteners and a portion of the seat of the connector are shown in dotted lines.

Figure 24:
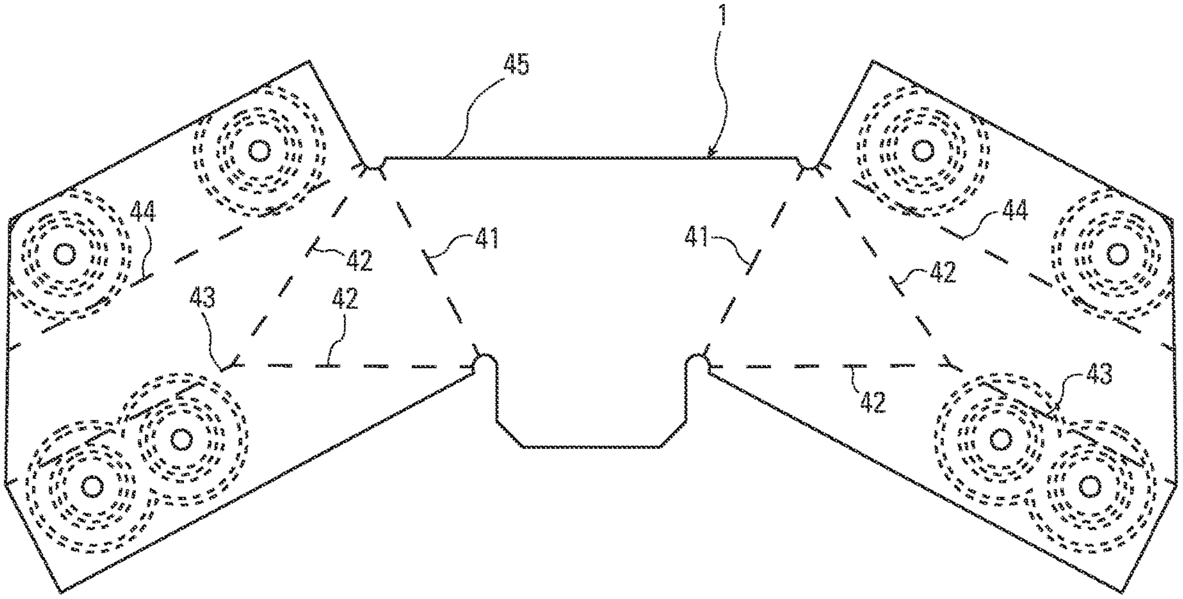

FIG. 24 is a view of the blank of the connector of FIG. 20.

Figure 25:
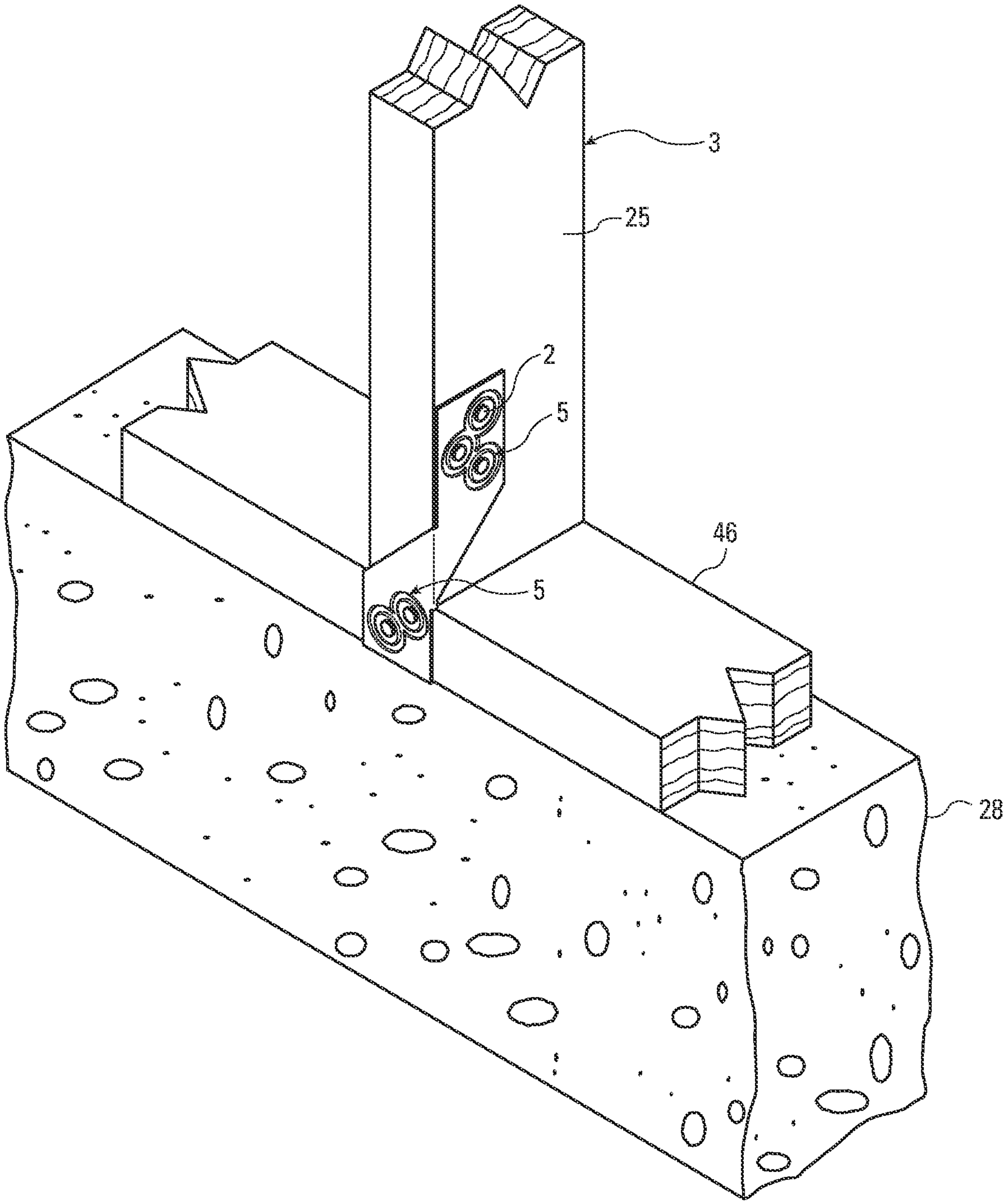

FIG. 25 is a perspective view of a connection made according to the present invention. The connector is formed with fastening and alignment members of the present invention. The connector is a strap shown joining a sill plate to a stud.

Figure 26:
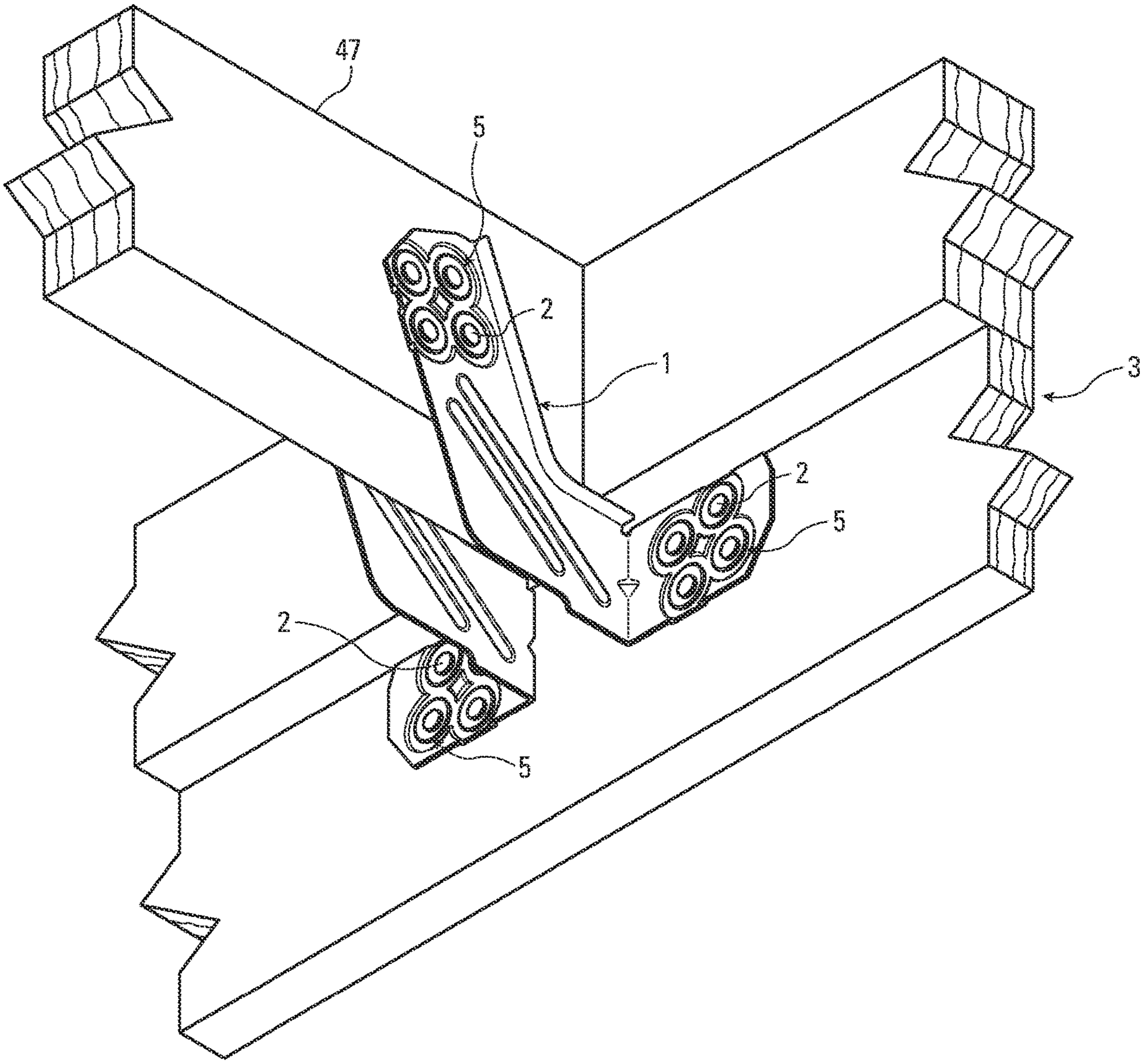

FIG. 26 is a perspective view of a connection made according to the present invention. The connector is formed with fastening and alignment members of the present invention. The connector is a strap shown joining a rafter to a rim board in a wall.

DETAILED DESCRIPTION OF THE PREFERRED EMBODIMENT

Figure 1:
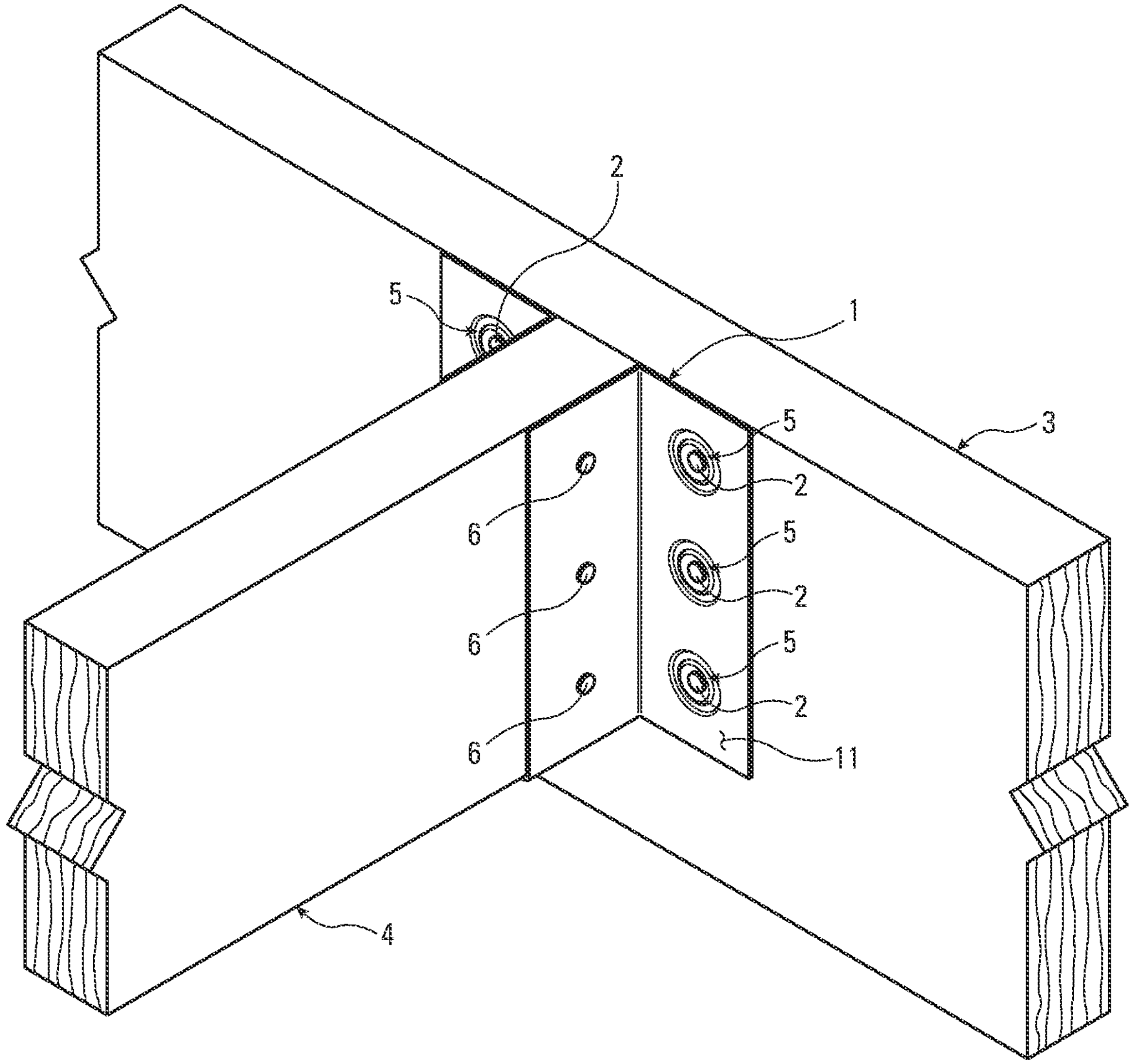

As shown in FIG. 1, the present invention provides a connection between a connector 1, a fastener 2 and a structural member 3. As shown in FIG. 1, structural member 3 is a supporting member such as a header 3 for a joist 4. The connector 1 is formed with fastening and alignment members 5 where the connector receives the fasteners 2 that are driven through the connector 1 and into the structural member 3. Additional fasteners 6 are shown attaching the connector 1 to the joist 4.

Figure 2:
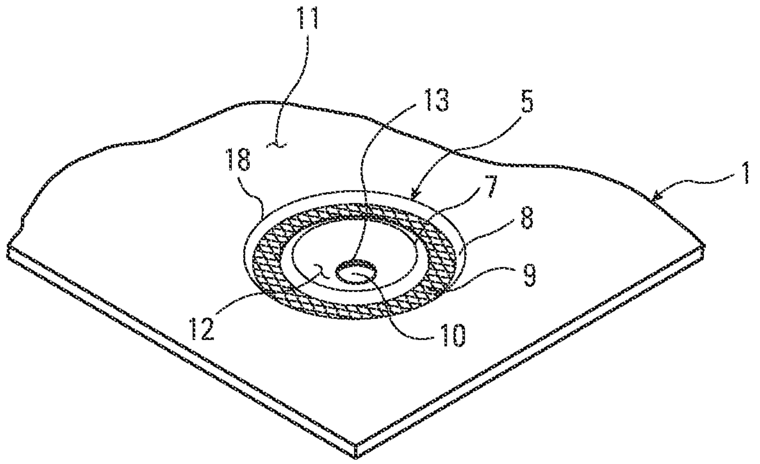
FIG. 2 is a perspective view of a portion of a connector formed with a fastening and alignment member of the present invention.

As shown in FIGS. 1 and 2, the fastening and alignment member 5 is formed as a pair of concentrically disposed upper portions 7 and 8 separated by a groove, trough or recess 9, surrounding an opening 10 in the connector 1. The innermost upper portion 7 is preferably formed as a ring. The outer upper portion 8 is the front surface 11 of the connector 1. The sloping surface 12 that makes up part of the fastening and alignment member 5 descends from the upper portion 7 of the ring to the rim 13 of the opening 10 in the connector 1. As shown in FIGS. 1 and 2, the sloping surface 12 is located on the periphery of or adjacent to the opening 10.

As shown in FIG. 2, the recess or trough 9 is shown with hatchings to roughen the receiving surface 14 of the trough.

As shown in FIG. 2, the sloping surface or surfaces 12 descend from one or more upper portions 7 adjacent to the sloping surfaces 12. The upper portions 7 are located radially farther away from the opening 10 or predetermined location for the fastener 2. Preferably, the upper portions 7 are arranged in concentric manner around the fastener opening 10 or predetermined location for the fastener. As shown in FIG. 2, the sloping surface 12 is a single annular surface making a conical frustum.

As shown in FIG. 2, the one or more upper portions 7 can be surrounded by a groove 9. The one or more upper portions 7 can partially or fully circumscribe the predetermined position for the fastener 2. Preferably, the fastening and alignment member 5 is formed with the upper portion 7 as a ring.

Figure 3:
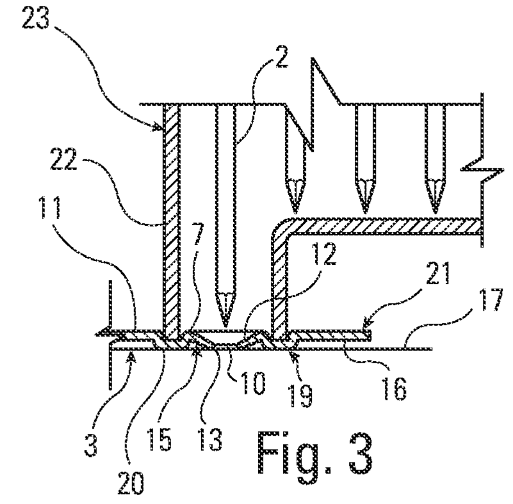
FIG. 3 is a cross-sectional view of a connector formed with a fastening and alignment member of the present invention, and of a nail gun received by the fastening and alignment member and ready to drive a nail through an opening in the connector for the fastener.

As shown in FIG. 3, the sloping surface 12 is part of a projecting member 15 that protrudes below the back face 16 of the connector 1. The projecting member 15 is adjacent to the opening 10 and preferably surrounds the entire periphery of the opening 10. Preferably, the projecting member 15 is concentric with the opening 10. Preferably, the rim 13 of the opening 10 is depressed with respect to the front surface 11 of the radially outlying portions of the connector 1 around the opening 10 or predetermined location for the fastener 2. In certain embodiments, the projecting member 15 protrudes towards the attachment face or attachment surface 17 of the structural member 3, but not far enough to enter the structural member 3 as is shown in FIG. 3.

As shown in FIG. 3, the fastening and alignment member 5 is formed as a upper ring 7 separated by a trough or groove or other recess 9 from the surrounding material of the connector. The upper portion of the outer side wall 18 of the trough 9 that rises to the front surface 11 of the connector 1 disposed radially outward from the annular trough or recess 9 constitutes the outer upper portion 8 of the fastening and alignment member 5. The groove or recess 9 between the upper portions 7 and 8 is part of a protruding member 19 having a back surface 20, as shown in FIG. 19, that projects farther away from the front surface 11 of the connector 1 than the back surfaces 16 of the connector 1 that are disposed radially outward and farther away from the opening 10 than the trough 9. Preferably, the trough 9 is part of the protruding member 19 that protrudes below the back face 16 of the connector 1. The protruding member 19 protrudes towards and makes contact with the attachment face 17 of the structural member 3. The back surface 20 of the protruding member 19 can extend as far toward the attachment face 17 of the structural member 3 as the projecting member 15. Preferably, the projecting member 15 extends farthest away from the front surface 11 of the connector 1 than the back surface 20 of the protruding member 19 and the back surface 16 of the portions of the connector 1 disposed radially outward from the recess or trough 9 surrounding the opening 10.

As shown in FIG. 3, the body portion 21 of the connector 1 is preferably formed as a planar member with planar front and back surfaces 11 and 16 and the fastening and alignment member 5 is a deformed portion or deformation in the body portion 21 of the connector 1 that creates depressions in the planar front surface 11 and protrusions or projections extending out of the planar back surface 16 of the connector 1. The result, in certain arrangements as shown in FIG. 3, is that the fastening an alignment member 5 lifts the body portion 21 of the connector 1 off of the attachment face 17 of the structural member 3.

As shown in FIGS. 16, 17 and 19, in the present invention the structural member 3 has a generally planar attachment face 17, the fastener has an elongated shaft 33, a portion of the elongated shaft 33 being received by the structural member 3 and entering the structural member 3 through the attachment face 17. The fastener is also received by the connector 1. The connector 1 has a body portion 21, the body portion 21 being a generally planar member having a generally planar front surface 11 disposed away from the attachment face 17 of the structural member 3 and a generally planar back surface 16 disposed facing the attachment face 17 of the structural member 3. The body portion also has a predetermined location 10 for the fastener 2, the fastener 2 being received by the body portion 21 at the predetermined location 10 or adjacent thereto. The body portion 21 has a deformed portion adjacent the predetermined location 10 for the fastener 2. The deformed portion includes a projecting member 15 that projects rearwardly towards the attachment face 17 of the structural member 3. The projecting member 15 has a sloping surface 12 that descends toward the predetermined location 10. The projecting member 15 descends from an upper portion 7 of the deformed portion, with the projecting member 15 projecting closer to the attachment face 17 of the structural member 3 than the generally planar back surface 16 of the connector 1 when the planar attachment face 17 of the structural member 3 and the generally planar back surface 16 of the body portion 21 of the connector 1 are substantially parallel. The upper portion 7 is adjacent to the projecting member 15 and radially farther away from the predetermined location 10 for the fastener 2 than the projecting member 15. Adjacent to the upper portion 7 is a protruding member 19 that projects rearwardly towards the attachment face 17 of the structural member 3, with the protruding member 19 being disposed closer to the attachment face 17 of the structural member 3 than the upper portion 7 of the deformed portion, and the protruding member 19 is disposed closer to the attachment face 17 of the structural member 3 than the generally planar back surface 16 of the body portion 21 when the planar attachment face 17 of the structural member 3 and the generally planar back surface 16 of the body portion 21 of the connector 1 are substantially parallel. Adjacent to the protruding member 19 is a second upper portion 8, the second upper portion 8 is radially farther away from the predetermined location 10 for the fastener 2 than the protruding member 19, the protruding member 19 being disposed closer to the attachment face 17 of the structural member 3 than the second upper portion 8 when the planar attachment face 17 of the structural member 3 and the generally planar back surface 16 of the body portion 21 of the connector 1 are substantially parallel.

As is also shown in FIG. 16, the protruding member 16 that projects rearwardly towards the attachment face 17 of the structural member 1 has a flat surface facing the attachment face 17 of the structural member 3.

FIG. 3 shows the cylindrical nose 22 of a power fastener tool 23 received in the recess or trough 9 of the fastening and alignment member 5 and between the inner upper portion 7 and the outer upper portion 8 of the fastening and alignment member 5.

Figure 4:
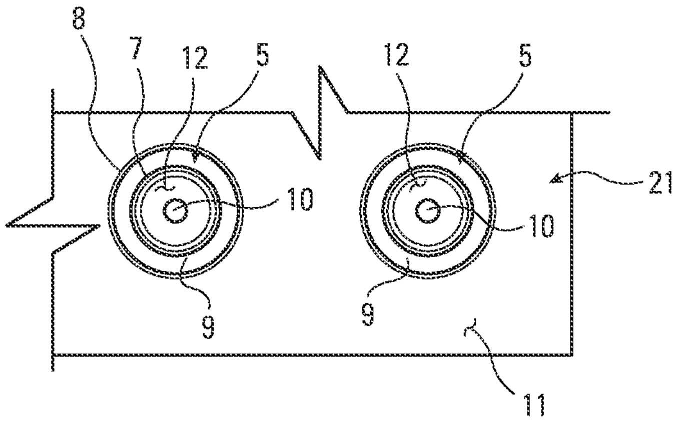
FIG. 4 is a top view of a portion of a connector formed with fastening and alignment members.

FIG. 4 shows a pair of fastening and alignment members 5 in the body portion of a connector 1.

Figure 5:
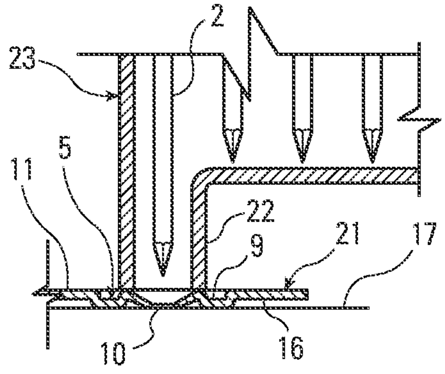
FIG. 5 is a cross-sectional view of a connector formed with a fastening and alignment member of the present invention, and of a nail gun in contact with the fastening and alignment member and ready to drive a nail through an opening in the connector for the fastener.

FIG. 5 shows the cylindrical nose 22 of a power fastener tool 23 engaging the inner upper portion 7 of the fastening and alignment member 5.

FIG. 6 is similar to FIG. 1, except that it shows fastening and alignment members in the body portions 21 of the connector that will receive fasteners 2 that are driven into the joist 4.

FIG. 7 shows a holdown connector 1 where fastening and alignment members 5 are formed in the back member 24 for attaching the holdown connector 1 to a upright stud 25. The holdown has a seat 26 receiving an anchor 27 embedded in a concrete member 28. The back 24 is connected to the seat by means of side flanges 29.

FIG. 8 shows a strap holdown connector 1 where fastening and alignment members 5 are formed in the strap member 30 for attaching the strap holdown connector 1 to a upright stud 25. The strap holdown has an anchor portion 31 embedded in a concrete member 28.

FIG. 9 shows a strap connector 1 where fastening and alignment members 5 are formed in the strap connection for attaching the strap connector 1 to uprights studs 25 above and below a floor 32 in the wall 48 of a building.

FIG. 10 shows the cylindrical nose 22 of a power fastener tool 23 received on the sloping surface 12 of the projecting member 15 of the fastening and alignment member 5.

FIG. 11 shows the cylindrical nose 22 of a power fastener tool 23 disposed above the fastening and alignment member 5 with the fastener 2 received in the opening 10.

FIG. 12 shows the cylindrical nose 22 of a power fastener tool 23 received in the recess or trough 9 of the fastening and alignment member 5 and between the inner upper portion 7 and the outer upper portion 8 of the fastening and alignment member 5.

FIG. 13 shows the cylindrical nose 22 of a power fastener tool 23 disposed above the fastening and alignment member 5 with the fastener 2 received on the sloping surface 12 of the projecting member 15. The sloping surface 12 will help guide the fastener into the opening 10.

FIG. 14 shows the projecting finger guide 32 of a power fastener tool 23 received in the opening 10 in the fastening and alignment member 5 with the fastener 2 aligned with the opening 10. As shown in FIGS. 13 and 14, the projecting member 15 projects below the back face 16 of the connector 1, such that it is embedded in the material of the support member 3.

As shown in FIG. 15, the sloping surface or surfaces 12 descend from one or more upper portions 7 adjacent to the sloping surfaces 12. The sloping surfaces 12 are a plurality of valleys or grooves descending towards the opening 10.

FIG. 16 shows a fastener 2, in a particular a nail, embedded in the structural member 3. The fastener 2 has a shaft 33 and a head 34 that has portions that flare outwardly from the shaft 33. The nail 2 has been driven with sufficient force that the flaring portions of the head 34 engage the sloped surfaces 12 of the fastening and alignment member 5.

FIG. 17 shows a nail embedded in the structural member 3. The nail 2 has been driven with insufficient force such that the flaring portions of the head 34 do not engage the sloped surfaces 12 of the fastening and alignment member 5.

FIG. 18 shows a nail embedded in the structural member 3. As in FIG. 17, the nail 2 has been driven with insufficient force. The connector 1 is shown under forces that want to lift up one side of the connector 1 around the opening. As the connector lifts, the head 34 engages the sloped surface 12 of the fastening and alignment member 5. A similar under-driven nail used with a connector that did not have the fastening and alignment member 5 of the present invention would not engage the connector 1 as quickly as does the fastener 2 used with the present invention.

FIG. 19 shows a nail 2 embedded in the structural member 3. The projecting member 15 of the fastening and alignment member 5 is embedded in the structural member 3. The protruding member 19 engages, and is in registration with the attachment face 17 of the structural member 3. The bottom surface 20 of the protruding member 19 is flat and distributes the compression load imposed by the nail head 34 engaging the fastening and alignment member 5 over a large surface area.

FIG. 20 shows a connection between a structural member 3, a joist 4 and a hanger connector 1. The connector 1 is formed with fastening and alignment members 5 on its back flange 35 and its side flanges 36.

FIG. 21 shows the hanger connector 1 having a seat 37 connecting the side flanges 36. The side flanges 36 extend upwardly from the seat 37. The side flanges 36 consist of three substantially planar portions: a substantially triangular gusset portion 38 and a front upstanding flange portion 39 and a rear upstanding flange portion 40. The triangular gusset portion 8 has a seat side edge 41 where it connects to the seat. Preferably this seat side edge 41 is set at a non-orthogonal angle to the back flanges 35. The triangular gusset portion 38 is set at a non-orthogonal angle to the seat 37, extending upwardly and away from the seat 37, rather than upwardly and over the seat 37. The front and rear upstanding flange portions 39 and 40 each attach to one of the other side edges 42 of the substantially triangular gusset portion 38, and attach to each other along a common side edge 43. The front upstanding flange portion 39 is set at a non-orthogonal angle to the back flanges 35 and the attachment face 17 of the structural member 3. This allows a fastener 2 to be driven orthogonally to front upstanding side flange portion 39 and enter the joist 4 at a non-orthogonal angle. Preferably, the rear upstanding flange portion 40 is set at an orthogonal angle to the back flanges 35. The rear upstanding flange portion 40 connects to the back flange 35 along a shared side edge 44.

FIG. 22 also shows the hanger connector 1. This side view provides a view of the protruding member 19 and the projecting member 15 extending from the back surface 16 of the body 21, in this case the back flange 35 of the hanger connector 1. The fastening and alignment members 5 can be disclosed close enough together, as on the front flange portions 39 of the side flanges 36, that the inner upper portion 7 for one opening 10 can serve as the outer upper portion 8 for an adjacent opening 10.

FIG. 23 also shows the hanger connector 1. The top view shows the fasteners 2 received through fastening and alignment members 5 in the side flanges 36. The fasteners are driven at a non-orthogonal angle to both the joist 4 and the structural member or header 4. The fasteners 2 received by the side flanges 36 enter the joist 4 and extend through the joist 4 to be embedded in the structural member 3 creating a strong connection. Fasteners 2 are also shown received by fastening and alignment members 5 in the back flanges 35 of the hanger connector 1. The projecting members 15 of the fastening and alignment members 5 in the back flanges 35 are embedded in the structural member 3. The protruding members of the fastening and alignment members 5 interface with the attachment face of the structural member 3.

The connector can be formed such that it has a first side flange 36, and the first side flange 36 is disposed in close proximity to the joist 4. The first side flange 36 has a substantially triangular-shaped gusset portion 38 that is substantially planar, a substantially planar front upstanding flange portion 39, and a substantially planar rear upstanding flange portion 40, and the triangular-shaped gusset portion 38 has a seat side edge 41. The substantially planar front and rear upstanding flange portions 39 and 40 of the first side flange 36 each attach to a different side edge 42 of the triangular-shaped gusset portion 38 that is not the seat side edge 41. The substantially planar front and rear upstanding flange portions 39 and 40 of the first side flange 36 attach together along a common flange portion side edge 43. The substantially planar rear upstanding flange portion 40 connects to a back flange 35 along a shared side edge 44 between the back flange 35 and the substantially planar rear upstanding flange portion 40. The back flange 35 interfaces with the structural member 3 and is attached to the structural member 3 by one or more fasteners 2.

FIG. 24 shows a blank 45 that can be folded to become the hanger connector 1 shown in FIGS. 20 through 23. The bend lines are shown as dotted lines, and the dotted lines show where the fastening and alignment members 5 will be formed. Preferably, the connector 1 is made from sheet steel, and the fastening and alignment members 5 are preferably made by cold-forming operations using a punch and die.

FIG. 25 shows a tie connector 1 where fastening and alignment members 5 are formed in angled portions for attaching the tie connector 1 to an upright stud 25 above and a mudsill 46.

FIG. 26 shows a rafter tie 1 where fastening and alignment members 5 are formed in the attachment members to attach the rafter tie to a structural member 3 and a roof member 47.

We claim:

1. A connection between a structural member, a connector and a fastener, the connection comprising:
a. the structural member having a planar attachment face;
b. the fastener having an elongated shaft, a portion of the elongated shaft being received by the structural member and entering the structural member through the attachment face, the fastener also being received by the connector; and
c. the connector, the connector having a body portion, the body portion being a planar member having a planar front surface disposed away from the attachment face of the structural member and a planar back surface disposed facing the attachment face of the structural member, the body portion also having a predetermined location for the fastener, the fastener being received by the body portion at the predetermined location or adjacent thereto; the body portion having a deformed portion adjacent the predetermined location for the fastener, the deformed portion including a projecting member that projects rearwardly towards the attachment face of the structural member, the projecting member having a sloping surface that descends toward the predetermined location, the projecting member descends from an upper portion of the deformed portion, the projecting member projecting closer to the attachment face of the structural member than the planar back surface of the connector when the planar attachment face of the structural member and the planar back surface of the body portion of the connector are parallel, the upper portion being adjacent to the projecting member and radially farther away from the predetermined location for the fastener than the projecting member, adjacent to the upper portion is a protruding member that projects rearwardly towards the attachment face of the structural member, the protruding member being disposed closer to the attachment face of the structural member than the upper portion of the deformed portion, the protruding member being disposed closer to the attachment face of the structural member than the planar back surface of the connector when the planar attachment face of the structural member and the planar back surface of the body portion of the connector are parallel, the protruding member extending as far as the projecting member, adjacent to the protruding member is a second upper portion, the second upper portion being radially farther away from the predetermined location for the fastener than the protruding member, the protruding member being disposed closer to the attachment face of the structural member than the second upper portion when the planar attachment face of the structural member and the planar back surface of the body portion of the connector are parallel, the first and second upper portions being concentrically disposed around the predetermined location for the fastener; and wherein
d. the fastener has a head that has portions that flare outwardly from the shaft and engage the sloped surface of the projecting member.

2. The connection of claim 1, wherein:
the projecting member surrounds the predetermined location for the fastener, and the projecting member fully circumscribes the predetermined location for the fastener.

3. The connection of claim 1, wherein:
a portion of the projecting member is embedded in the structural member.

4. The connection of claim 1, wherein:
the predetermined location for the fastener is an opening in the body portion and the opening has a rim which is disposed closer to the attachment face of the structural member than the upper portion when the planar attachment face of the structural member and the planar back surface of the body portion of the connector are parallel.

5. The connection of claim 1, wherein:
the sloping surface is a single annular surface making a conical frustum.

6. The connection of claim 1, wherein:
the protruding member and the projecting member are arranged in a concentric manner around the predetermined location for the fastener.

7. The connection of claim 1, wherein:
the projecting member sloping surface descends to the predetermined location for the fastener.

8. The connection of claim 1, wherein:
the projecting member and the protruding member lift the body portion of the connector off of the attachment face of the structural member.

9. The connection of claim 8, wherein:
the first upper portion fully circumscribes the predetermined location for the fastener and the second upper member is an arc.

10. The connection of claim 8, wherein:
a. the body portion also having a second predetermined location for receiving a second fastener; and
b. and the first upper portion serves as a second upper portion for the second predetermined location for receiving a second fastener.

11. The connection of claim 1, wherein:
the protruding member has a receiving surface facing away from the attachment face of the structural member and facing in the same direction as the front surface of the body portion and the protruding member is made with hatchings to roughen the receiving surface of the protruding member.

12. A connection between a structural member, a connector and a fastener, the connection comprising:
a. the structural member having a planar attachment face;
b. the fastener having an elongated shaft, a portion of the elongated shaft being received by the structural member and entering the structural member through the attachment face, the fastener also being received by the connector; and
c. the connector, the connector having a body portion, the body portion having a planar front surface disposed away from the attachment face of the structural member and a planar back surface disposed facing the attachment face of the structural member, the body portion also having a predetermined location for the fastener, the fastener being received by the body portion at the predetermined location or adjacent thereto; the body portion having a deformed portion adjacent the predetermined location for the fastener, the deformed portion including a projecting member that projects rearwardly towards the attachment face of the structural member, the projecting member having a sloping surface that descends toward the predetermined location, the projecting member descends from an upper portion of the deformed portion, the upper portion being adjacent to the projecting member and radially farther away from the predetermined location for the fastener than the projecting member, adjacent to the upper portion is a protruding member that projects rearwardly towards the attachment face of the structural member, the protruding member having a flat surface facing the attachment face of the structural member, the protruding member being disposed closer to the attachment face of the structural member than the upper portion of the deformed portion when the planar attachment face of the structural member and the planar back surface of the body portion of the connector are parallel, the protruding member extending as far as the projecting member, adjacent to the protruding member is a second upper portion, the second upper portion being radially farther away from the predetermined location for the fastener than the protruding member, the protruding member being disposed closer to the attachment face of the structural member than the second upper portion when the planar attachment face of the structural member and the planar back surface of the body portion of the connector are parallel, the first and second upper portions being concentrically disposed around the predetermined location for the fastener; and wherein d. the fastener has a head that has portions that flare outwardly from the shaft and engage the sloped surface of the projecting member.

13. The connection of claim 12, wherein:

the projecting member surrounds the predetermined location for the fastener, and the protruding member fully circumscribes the predetermined location for the fastener.

14. The connection of claim 12, wherein:

a portion of the projecting member is embedded in the structural member.

15. The connection of claim 12, wherein:

the predetermined location for the fastener is an opening in the body portion and the opening has a rim which is disposed closer to the attachment face of the structural member than the upper portion when the planar attachment face of the structural member and the planar back surface of the body portion of the connector are parallel.

16. The connection of claim 12, wherein:

the sloping surface is a single annular surface making a conical frustum.

17. The connection of claim 12, wherein:

the protruding member and the projecting member are arranged in a concentric manner around the predetermined location for the fastener.

18. The connection of claim 12, wherein:

the projecting member sloping surface descends to the predetermined location for the fastener.

19. The connection of claim 12, wherein:

the projecting member and the protruding member lift the body portion of the connector off of the attachment face of the structural member.

20. The connection of claim 19, wherein:

the first upper portion fully circumscribes the predetermined location for the fastener and the second upper member is an arc.

21. The connection of claim 19, wherein:

a. the body portion also having a second predetermined location for receiving a second fastener; and b. and the first upper portion serves as a second upper portion for the second predetermined location for receiving a second fastener.

22. The connection of claim 12, wherein:

the protruding member has a receiving surface facing away from the attachment face of the structural member and facing in the same direction as the front surface of the body portion and the protruding member is made with hatchings to roughen the receiving surface of the protruding member.

* * * * *